United States Patent
Yonemoto et al.

(10) Patent No.: US 11,920,076 B2
(45) Date of Patent: Mar. 5, 2024

(54) FIRE RETARDANT MATERIAL

(71) Applicant: TOKYO UNIVERSITY OF SCIENCE FOUNDATION, Tokyo (JP)

(72) Inventors: Koichi Yonemoto, Tokyo (JP); Kiyoto Murakami, Fukuoka (JP); Satoshi Nonaka, Kanagawa (JP)

(73) Assignee: TOKYO UNIVERSITY OF SCIENCE FOUNDATION, Tokyo (JP)

( * ) Notice: Subject to any disclaimer, the term of this patent is extended or adjusted under 35 U.S.C. 154(b) by 1000 days.

(21) Appl. No.: 16/755,355

(22) PCT Filed: Oct. 12, 2018

(86) PCT No.: PCT/JP2018/038037
§ 371 (c)(1),
(2) Date: Apr. 10, 2020

(87) PCT Pub. No.: WO2019/074082
PCT Pub. Date: Apr. 18, 2019

(65) Prior Publication Data
US 2020/0299583 A1    Sep. 24, 2020

(30) Foreign Application Priority Data

Oct. 13, 2017   (JP) ................. 2017-199136

(51) Int. Cl.
| C09K 21/02 | (2006.01) |
| C08J 5/04 | (2006.01) |
| C09K 21/14 | (2006.01) |
| D01F 9/145 | (2006.01) |
| F17C 1/16 | (2006.01) |

(52) U.S. Cl.
CPC ............... *C09K 21/02* (2013.01); *C08J 5/042* (2013.01); *C09K 21/14* (2013.01); *D01F 9/145* (2013.01); *F17C 1/16* (2013.01); *C08J 2369/00* (2013.01); *F17C 2221/011* (2013.01); *F17C 2260/042* (2013.01); *F17C 2270/0102* (2013.01); *F17C 2270/0178* (2013.01); *F17C 2270/0189* (2013.01); *F17C 2270/0197* (2013.01)

(58) Field of Classification Search
USPC ...................... 220/560.04; 252/604; 524/495
See application file for complete search history.

(56) References Cited

U.S. PATENT DOCUMENTS

2016/0264752 A1    9/2016   L'Intermy et al.

FOREIGN PATENT DOCUMENTS

| CN | 104151707 | 11/2014 |
| CN | 104151768 | 11/2014 |
| CN | 104151805 | 11/2014 |
| CN | 104177823 | 12/2014 |

(Continued)

OTHER PUBLICATIONS

Extended European Search Report issued in EP Pat. Application No. 18866123.5, dated May 25, 2021.

(Continued)

*Primary Examiner* — Fred M Teskin
(74) *Attorney, Agent, or Firm* — GREENBLUM & BERNSTEIN P.L.C.

(57) ABSTRACT

A fire retardant material comprising a carbon fiber which tensile elasticity is 700 GPa or more, and a fire retardant resin such as polycarbonate.

6 Claims, 4 Drawing Sheets

(56) References Cited

FOREIGN PATENT DOCUMENTS

| | | |
|---|---|---|
| CN | 104194286 | 12/2014 |
| CN | 108342084 | 7/2018 |
| JP | 62-289617 | 12/1987 |
| JP | 63-243329 | 10/1988 |
| JP | 2014-205932 | 10/2014 |

OTHER PUBLICATIONS

Khaki McKee et al., "Advancing ORS Technologies and Capabilities with a Space Tourist Suborbital Vehicle", AIAA Space 2009 Conference & Exposition, Sep. 14-17, 2009, Pasadena, California.
ISR in International Application No. PCT/JP2018/038037, dated Jan. 15, 2019, English translation.
IPRP in International Application No. PCT/JP2018/038037, dated Jul. 16, 2019, English translation.

Fig. 1
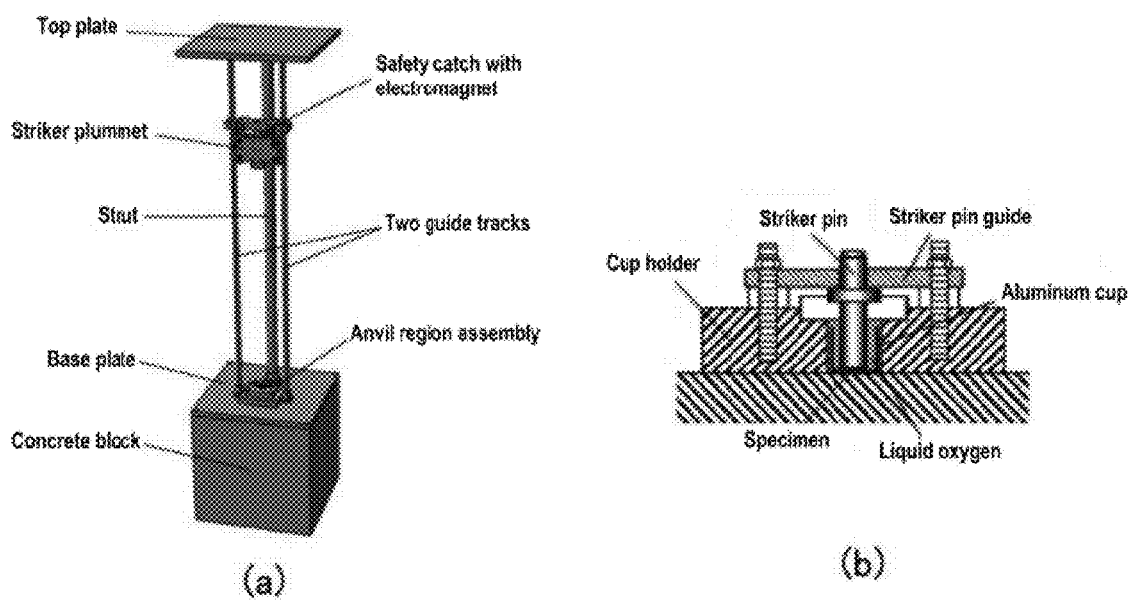
[Fig. 2]
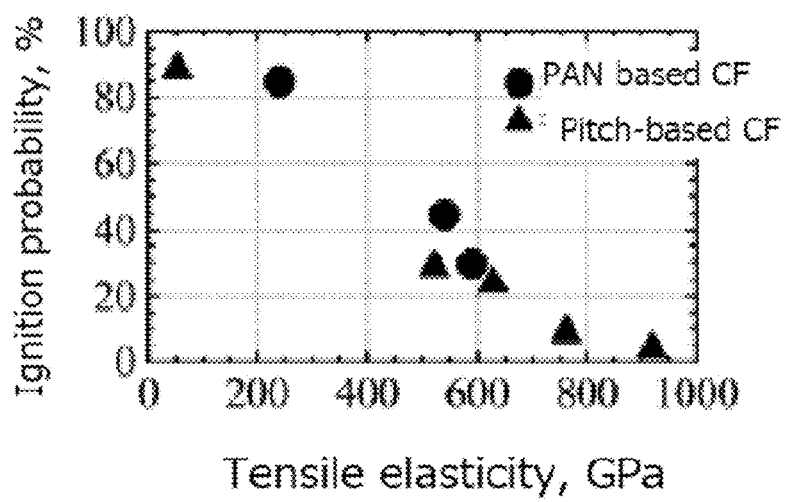

[Fig. 3]
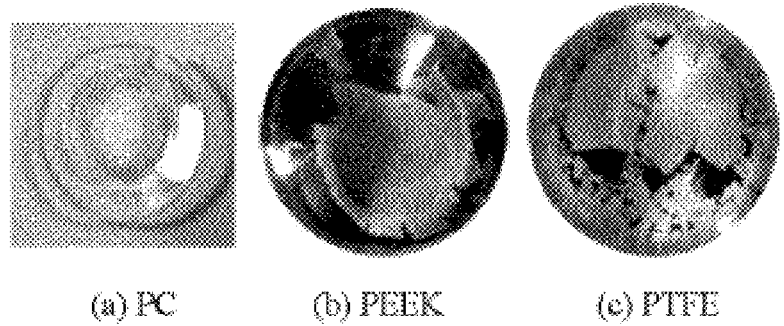
(a) PC  (b) PEEK  (c) PTFE
[Fig. 4]
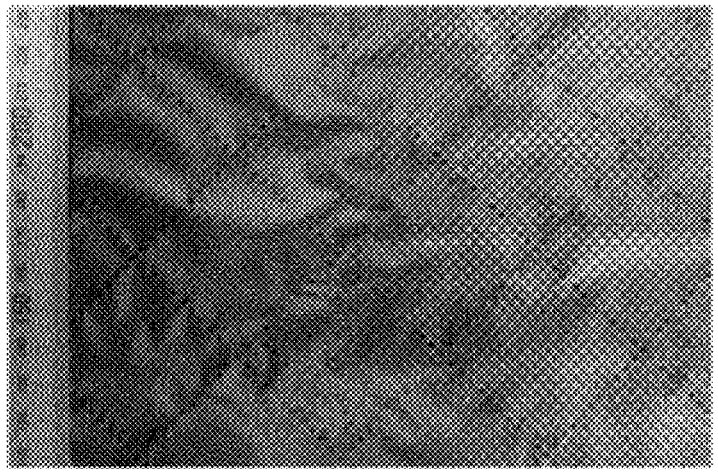
Fig. 5
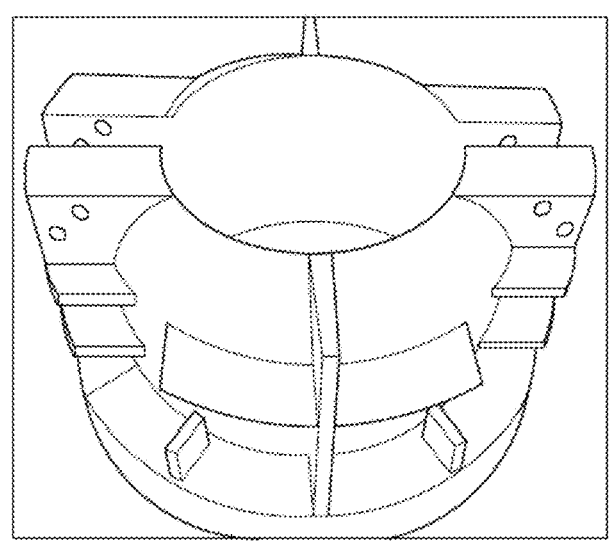

(a) appearance    (b) load transfer of the device

FIRE RETARDANT MATERIAL

TECHNICAL FIELD

The present invention relates to, for example, a fire retardant material (fire retardant carbon fiber reinforced plastic) manufactured by using a carbon fiber and resin.

BACKGROUND ART

Composite materials are widely applied to various structural parts needed to be light and requiring high strength, for aircrafts and space rockets, and recently also in automobiles. Among these, the structure of space rocket almost consists of fuel tanks. Metal materials such as aluminum alloy or titanium alloy are employed as their materials. To improve the efficiency of the fuel tanks, use of composite materials represented by carbon fiber reinforced plastic superior in specific strength compared with metal material is required (see non-patent reference 1). Further, in the future, to reduce the space transportation cost drastically by realizing the space rocket of reusable type, it is mandatory to lighten the airframe structure using of carbon fiber reinforced plastics.

For space rockets, etc., liquid oxygen is a common propellant. However, when an impact force is applied to carbon fiber or plastic in the presence of liquid oxygen for some reason, it ignites with the energy, and there is a risk that the tank or the like explode. Thus, it was not possible to apply carbon fiber plastic to liquid oxygen tank.

Further, besides the space rockets, also in the consumer products such as commercial tank lorries for ground transportation, etc., the development of tanks made of carbon fiber reinforced plastic for storing liquid with high oxidation property, such as liquid oxygen is strongly expected.

PRIOR ART REFERENCES

Non-Patent Documents

Non-Patent Document 1:
Khaki McKee et al. Advancing ORS Technologies and Capabilities with a Space Tourist Suborbital Vehicle, AIAA 2009-6690, AIAA SPACE 2009 Conference & Exposition, 14-17 Sep. 2009

SUMMARY OF THE INVENTION

Object to be Solved by the Invention

The object of the present invention is to provide a fire retardant material than can be applied to a structure where fire retardancy is required such as liquid oxygen tank that stores liquid having a high oxidation property.

Means to Solve the Object

As stated above, conventionally, there was a big technical problem that carbon fiber reinforced plastic can be easily ignited by some impact energy in the presence of liquid oxygen. Therefore, it was said not to be applicable to the material of liquid oxygen tanks, etc.

In view of such problems, the present inventors made various tests and research, and found out that carbon fibers having high elasticity are hardly ignited even in the presence of liquid oxygen. Further by combining such carbon fibers having high elasticity with particular fire retardant resins, a fire retardant carbon fiber reinforced plastic that is hardly ignited even in the presence of a liquid having a high oxygen property such as liquid oxygen can be realized. The present invention has been consequently completed based on the tests and research.

Specifically, the present invention relates to the following.

[1] A fire retardant material comprising a carbon fiber which tensile elasticity is 700 GPa or more.

[2] The fire retardant material according to [1], comprising a carbon fiber which tensile elasticity is 700 GPa or more, and a fire retardant resin.

[3] The fire retardant material according to [1] or [2], wherein the carbon fiber is a pitch-based carbon fiber.

[4] The fire retardant material according to [2] or [3], wherein the fire retardant resin is a resin which number of ignition is two times or less when 20 times of impact test are performed by ABMA type impact tester complying with ASTM (American Society for Testing and Materials) test method "D2512-95".

[5] The fire retardant material according to any one of [2] to [4], wherein the fire retardant resin is at least one type of resin selected from polycarbonate, polyether ether ketone, polytetrafluoroethylene, ethylene tetrafluoroethylene, and perfluoroalkyl vinyl ether.

[6] The fire retardant material according to [5], wherein the fire retardant resin is polycarbonate.

[7] The fire retardant material according to any one of [1] to [6], used for liquid oxygen tank.

[8] A liquid oxygen tank, wherein a part or whole is constituted from the fire retardant material according to any one of [1] to [7].

Effect of the Invention

The fire retardant material of the present invention is fire retardant, and at the same time, light and has high strength. Therefore, it can be applied to, for example, a material of tank that stores liquid having a high oxidation property, such as liquid oxygen, or the like.

BRIEF DESCRIPTION OF DRAWINGS

FIG. 1

Figure 6:
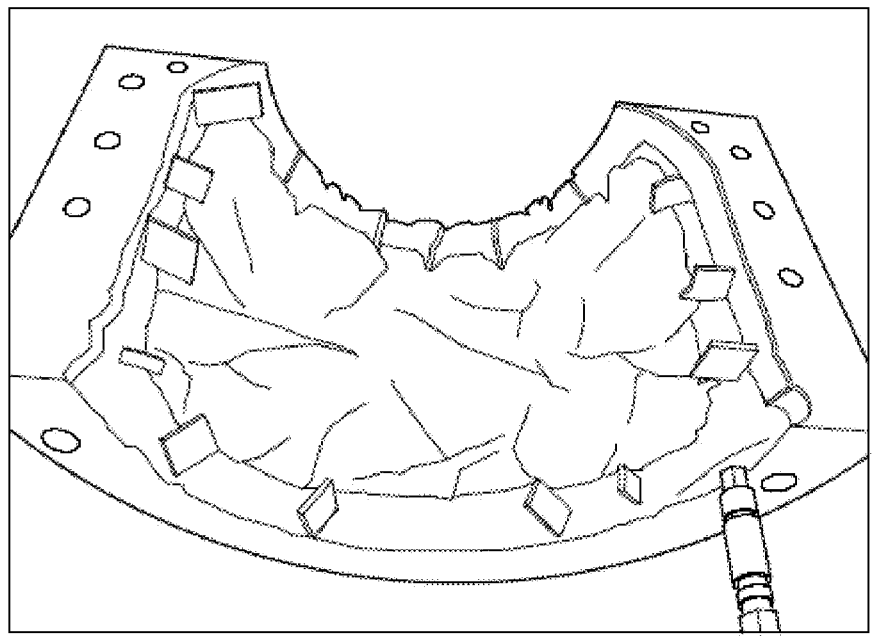

It is a figure explaining the ABMA type impact testing device used in the impact testing of the present invention. (a) shows the whole schematic view, and (b) shows the cross section view of the test part.

FIG. 2

It is a graph showing the relationship between the tensile elasticity of carbon fiber and its ignition probability.

FIG. 3

It is a set of photographs showing the specimens after the impact testing of the fire retardant resin of the present invention. (a) shows polycarbonate (PC), (b) shows polyether ether ketone (PEEK), and (c) shows polytetrafluoroethylene (PTFE).

FIG. 4

It is a photograph showing the semi-preg for molding a fire retardant carbon fiber reinforced plastic (CFRTP-PC) of the present invention.

FIG. 5

It is a photograph showing a half type forming die used for autoclave molding of a fire retardant carbon fiber reinforced plastic (CFRTP-PC) of the present invention.

FIG. 6

It is a photograph showing the bagging on the semi-preg in the half type forming dye shown in FIG. 5.

FIG. 7

It is a photograph showing the appearance of the fire retardant carbon fiber reinforced plastic (CFRTP-PC) of the present invention after autoclave molding.

FIG. 8

It is a figure explaining the testing device (universal tester with cryostat) used for the test of the present Examples. (a) shows the picture of device, and (b) shows the schematic load path of universal tester and cryostat.

FIG. 9

It is a graph showing the stress-strain diagram of polycarbonate (PC).

MODE FOR MAKING THE INVENTION

The fire retardant material of the present invention is characterized by a carbon fiber which tensile elasticity is 700 GPa or more, and a fire retardant resin.

The fire retardant material of the present invention can be applied to structural parts of aircrafts, space rockets, marine vessels, automobiles, buildings, etc., where fire retardancy and high specific strength are needed.

<Carbon Fiber>

As stated above, the carbon fiber in the present invention has the tensile elasticity of 700 GPa or more, and preferably 750 GPa or more. When the tensile elasticity is within this range, the ignition probability by impact in the presence of liquid oxygen is significantly low. On the other hand, the upper limit of the tensile elasticity is not particularly limited, but from the viewpoint of moldability, it is preferred to be 1200 GPa or less, more preferably 1000 GPa or less, and further preferably 900 GPa or less. Here, the tensile elasticity of a carbon fiber is a level measured by the measurement method specified by JIS R 7606.

Such carbon fiber in the present invention is preferably one which number of ignition is two times or less, more preferably one time or less, and particularly preferably time, when 20 times of impact test (liquid oxygen compatibility test) are performed by ABMA type impact testing device complying with ASTM (American Society for Testing and Materials) test method "D2512-95".

Here, the impact testing using ABMA type impact testing device of the present invention is explained. FIG. 1 is a figure explaining the ABMA type impact testing device used in the impact testing of the present invention. (a) shows the whole schematic view, and (b) shows the cross section view of the test part.

First, a striker pin is set on a specimen located inside the aluminum cup shown in FIG. 1 (b), the aluminum cup is filled with liquid oxygen (LOX), then a weight of 9.07 kg (20 lb) is dropped from the height of 1.1 m to the upper end of the striker pin. It is observed by recording on videotape whether the specimen is ignited or not by the impact force (impact energy: 97.9 J). The test is repeated 20 times with the same material, but the different specimen. The lower the number of ignition is, the higher the fire retardant is proved. For example, when no ignition occurs, it is determined to be completely "LOX compatible".

The types of carbon fiber of the present invention can be any type of polyacrylonitrile based (PAN based), pitch-based, rayon-based, etc. However, it is preferred to be a pitch-based carbon fiber, since it tends to have a high tensile elasticity. In carbon fiber, the crystal structure of carbon differs depending on the difference of the starting material. Pitch-based is characterized by that a graphite fiber wherein graphite crystals are highly oriented in the fiber axis direction as compared to PAN based can be obtained. For example, when using mesophase pitch as a starting material, an ultra-high elastic carbon fiber of greater than 900 GPa can be obtained.

<Fire Retardant Resin>

The fire retardant resin of the present invention is a resin which ignition probability by impact in the presence of liquid oxygen is low. Specifically, it is a resin which number of ignition is two times or less, more preferably one time or less, and particularly preferably 0 time, when 20 times of impact test are performed by ABMA type impact testing device complying with ASTM (American Society for Testing and Materials) test method "D2512-95".

Such fire retardant can be a thermosetting resin or a thermoplastic resin. However, a thermoplastic resin is preferable, since the ignition probability becomes low. Examples of fire retardant thermoplastic resin include polyacetal (POM), polycarbonate (PC), polyetherimide (PEI), polyethersulfone (PES), polyether ether ketone (PEEK), and fluorine based resin. Examples of fluorine based resins specifically include polytetrafluoroethylene (PTFE), ethylene tetrafluoroethylene (ETFE), perfluoroalkyl vinyl ether copolymer (PFA), and the like. Among these resins, polycarbonate, polyether ether ketone, polytetrafluoroethylene, ethylene tetrafluoroethylene, perfluoroalkyl vinyl ether copolymer are preferable, and polycarbonate and polyether ether ketone are preferable from the point of the property being complexed with carbon fiber.

As for fire retardant resin of the present invention, particularly, polycarbonate is preferable. Specifically, the fire retardant carbon fiber reinforced plastic is particularly preferable to comprise a carbon fiber which tensile elasticity is 700 GPa or more, and a polycarbonate.

An intermediate base material such as prepreg and semi-preg with polycarbonate can be easily molded by combining with carbon fiber, and the fire retardant carbon fiber reinforced plastic can be also easily molded. Specifically, the formation of curved surface for fuel tank liner, etc. or the formation of complex shape can be easily performed.

Further, since the polycarbonate has a large fracture strain at the cryogenic temperature of about −200° C., the matrix cracks of the complexed fire retardant carbon fiber reinforced plastic hardly occurs at the cryogenic temperature. Therefore, the fire retardant carbon fiber reinforced plastic complexed with polycarbonate is suitable as a material of liquid oxygen tank.

Further, since the adhesiveness of polycarbonate with aluminum alloy used for the cap of liquid oxygen tank at the cryogenic temperature of about −200° C. is excellent, the fire retardant carbon fiber reinforced plastic complexed with polycarbonate is suitable as a material of liquid oxygen tank, also from this point of view.

Specifically, since usually the pipes connected to the tank are made of metal, the cap made of metal is attached as a joint between the tank and the pipe. Since the metal materials have a larger linear expansion coefficient as compared with a complex material (carbon fiber reinforced plastic), interfacial fracture is likely to occur between the cap and the composite material at cryogenic temperature and when the tank is pressurized. However, polycarbonate can be also suitably used for the adhesion (fusion) between the cap and the tank (for example, liner material made of carbon fiber reinforced plastic of the present invention using PC), and it is effective to prevent interfacial fracture, and to avoid the risk of ignition in the presence of liquid oxygen.

The method of molding the fire retardant carbon fiber reinforced plastic of the present invention is not particularly limited. It is possible to prepare an intermediate base material such as prepreg and semi-preg with a carbon fiber and a fire retardant resin, and then to mold the intermediate base material in an autoclave. It is preferable to use a semi-preg, from the point of flexibility and formativeness. It is also possible to employ vacuum bag molding method. However, it is not limited to these molding methods.

The fire retardant material of the present invention is preferably applied to the whole or a part of the structure of liquid oxygen tank. Specifically, for example, it can be suitably used as a liner of liquid oxygen tank of not only space rockets, but also ground tank lorries and etc., for commercial utilization.

EXAMPLES

In the following, the Examples of the present invention are shown, while the scope of the present invention is not limited to these.

[Liquid Oxygen Compatibility Test (Impact Testing)]
(Test Method)

The liquid oxygen (LOX) compatibility of the present Examples has been assessed by the impact testing using ABMA type impact testing device complying with ASTM (American Society for Testing and Materials) test method "D2512-95" shown in FIG. 1. Specifically, a striker pin is set on a specimen located inside the aluminum cup shown in FIG. 1 (b), the aluminum cup was filled with liquid oxygen, then a weight of 9.07 kg (20 lb) was dropped from the height of 1.1 m to the upper end of the striker pin. It was observed by recording on videotape whether the specimen is ignited or not by the impact force (impact energy: 97.9 J). The test was repeated 20 times with the same material, for each of carbon fiber, fire retardant resin, and fire retardant carbon fiber reinforced plastic. The lower the number of ignition is, the higher the fire retardant is proved. When no ignition occurs, it was determined to be completely "LOX compatible".

The test piece shape of the fire retardant resin is a coin type with a diameter of 18.3±0.8 mm, and a thickness of 1.27±0.13 mm. For the case of a carbon fiber specimen, a sizing agent on the fiber surface was removed by ultrasonic cleaning with acetone, and then cut to a width of approximately 15 mm, and a total of 100 mg was placed in the aluminum cup and aligned in the same direction for use. For the fire retardant carbon fiber reinforced plastic, carbon fiber cross and polycarbonate film (thickness 50 μm) were alternately laminated and the plastic was collected from the plate that has been molded by being pressurized at a high temperature <Test for Carbon Fiber>

For the carbon fiber in the present test, PAN based and pitch-based carbon fibers having different tensile elasticity were used. The details of the carbon fibers used are shown in the following.

PAN based-1 (Tenax, manufactured by Toho Tenax Co., Ltd.; tensile elasticity 240 GPa)
PAN based-2 (Torayca, manufactured by Toray Co., Ltd.; tensile elasticity 540 GPa)
PAN based-3 (Torayca, manufactured by Toray Co., Ltd.; tensile elasticity 588 GPa)
Pitch-based 1 (Granoc, manufactured by Nippon Graphite Fiber Co., Ltd.; tensile elasticity 52 GPa)
Pitch-based 2 (Granoc, manufactured by Nippon Graphite Fiber Co., Ltd.; tensile elasticity 520 GPa)
Pitch-based 3 (Granoc, manufactured by Nippon Graphite Fiber Co., Ltd.; tensile elasticity 628 GPa)
Pitch-based 4 (Dialead, manufactured by Mitsubishi Chemical Corporation Ltd.; tensile elasticity 760 GPa)
Pitch-based 5 (Granoc, manufactured by Nippon Graphite Fiber Co., Ltd.; tensile elasticity 920 GPa)

(Test Results)

Table 1 shows the results of impact testing of carbon fiber. Further, FIG. 2 shows the graph showing the relationship between the tensile elasticity of carbon fiber and the ignition probability.

TABLE 1

| Specimen | Tensile elasticity (GPa) | Tensile strength (MPa) | Thermal conductivity (W/mK) | Number of Ignition/Number of Tests |
|---|---|---|---|---|
| PAN based-1 | 240 | 4200 | 10 | 17/20 |
| PAN based-2 | 540 | 4020 | 155 | 9/20 |
| PAN based-3 | 588 | 3820 | 160 | 6/20 |
| Pitch-based-1 | 52 | 1120 | 7 | 18/20 |
| Pitch-based-2 | 520 | 3830 | 120 | 6/20 |
| Pitch-based-3 | 628 | 3638 | 180 | 5/20 |
| Pitch-based-4 | 760 | 3200 | 200 | 2/20 |
| Pitch-based-5 | 920 | 3530 | 600 | 1/20 |

As it is shown in Table 1 and FIG. 2, it has been found that the larger the tensile elasticity is, the lower the ignition probability becomes. Since the carbon fiber having high elasticity has also a high heat conductivity, it is considered that the heat flux gained by the impact friction energy dissipated not to reach the ignition temperature.

<Test for Fire Retardant Resin>

In the present test, thermoplastic resins (fire retardant resin) shown in Table 2 were used.

(Test Results)

Table 2 shows the results of impact testing for thermoplastic resins (fire retardant resin).

TABLE 2

| Specimen classification | Name of resin | Abbreviation | Number of Ignition/Number of Tests |
|---|---|---|---|
| General engineering plastics | Polyacetal | POM | 1/20 |
| | Polycarbonate | PC | 0/20 |
| | Modified-Polyphenyleneether | m-PPE | 6/20 |
| | Polyethylene terephthalate | PET | 8/20 |
| Super engineering plastics | Polyacrylate | PAR | 5/20 |
| | Polyphenylene sulfide | PPS | 8/20 |
| | Polyether ether ketone | PEEK | 0/20 |
| | Polyetherimide | PEI | 2/20 |
| | Polyethersulfone | PES | 1/20 |
| | Polytetrafluoroethylene | PTFE | 0/20 |
| | Ethylene tetrafluoroethylene | ETFE | 0/20 |
| | Perfluoroalkyl vinyl ether copolymer | PFA | 0/20 |

As it is shown in Table 2, polyacetal (POM), polycarbonate (PC), polyether ether ketone (PEEK), polyetherimide (PEI), polyethersulfone (PES), polytetrafluoroethylene (PTFE), ethylene tetrafluoroethylene (ETFE), perfluoroalkyl vinyl ether copolymer (PFA) have a low number of ignition of 2 or less, and confirmed to have fire retardancy. Particularly, since the number of ignition of PC, PEEK, PTFE, ETFE and PFA was 0, they have compatibility to liquid oxygen.

Here, FIG. 3 shows a set of photographs of specimens after the impact testing for fire retardant resin. (a) shows a polycarbonate (PC), (b) shows a polyether ether ketone (PEEK), (c) shows a polytetrafluoroethylene (PTFE). As it is shown in FIG. 3, the fracture of PC specimen was relatively small, and it seems to keep the impact resistance at the temperature of liquid oxygen (−183° C.)

<Test for Fire Retardant Carbon Fiber Reinforced Plastics>

In the present test, the followings were used as fire retardant carbon fiber reinforced plastics (CFRTP).

Comparative Example 1

A carbon fiber reinforced thermoplastic plastic (CFRTP-PEEK) made by combining PAN based carbon fiber (0°/90° alternate laminate of UD (UniDerection) of carbon fiber PAN based-1 (240 GPa) used in the liquid oxygen compatibility test for carbon fibers) and PEEK was used.

Comparative Example 2

A carbon fiber reinforced thermoplastic plastic (CFRTP-PC) made by combining PAN based carbon fiber (cross of carbon fiber PAN based-3 (588 GPa) used in the liquid oxygen compatibility test of carbon fiber) and PC was used.

Example 1

A carbon fiber reinforced thermoplastic plastic (CFRTP-PC) made by combining pitch-based carbon fiber (cross of Granoc manufactured by Nippon Graphite Fiber Co., Ltd. (tensile elasticity 785 GPa) and PC was used.

For the CFRTP specimen, after preparing a semi-preg using carbon fiber and PC film (thickness 50 μm) at Sakai Ovex Co., Ltd., using an autoclave (A-3312, manufactured by ASHIDA MFG Co., Ltd.) the specimen was molded under the condition of pressure 3 Mpa, temperature 300° C. (10 minutes), vacuum pressure −0.1 MPa.

Table 3 shows the test results of impact testing for fire retardant carbon fiber reinforced plastics.

TABLE 3

| Matrix | Carbon fiber Type | Tensile elasticity (GPa) | Number of Ignition/ Number of Tests |
|---|---|---|---|
| PEEK | PAN based (UD material) | 240 | 4/8 |
| PC | PAN based (cross) | 588 | 6/20 |
|  | Pitch-based (cross) | 785 | 0/20 |

As it is shown in Table 3, the number of ignition of the fire retardant carbon fiber reinforced plastic of the present invention of Example 1 (lowest column) was 0, and it has been revealed to have compatibility to liquid oxygen. On the other hand, the number of ignition of the PAN based carbon fiber reinforced thermoplastic plastic (CFRP-PEEK) of Reference Example 1 was 4 out of 8 tested times, and was combustible. The relatively high ignition probability is caused by the low tensile elasticity and thermal conductivity of PAN based carbon fiber. Further, the number of ignition of the PAN based carbon fiber reinforced thermoplastic plastic (CFRP-PC) of Reference Example 2 was 6 out of 20 tested times. It is considered that the fire retardancy of the carbon fiber is not sufficient.

Meanwhile, the test using a carbon fiber reinforced thermoplastic plastic (CFRTP-PC) made by combining pitch-based carbon fiber (cross of Granoc manufactured by Nippon Graphite Fiber Co., Ltd. (tensile elasticity 920 GPa)) and PC was performed 5 times, and the number of ignition was 0, and good results were obtained.

<Curving Surface Molding Test for Fire Retardant Carbon Fiber Reinforced Plastic>

(Manufacture of Intermediate Base Material)

At Sakai Ovex Co., Ltd., a semi-preg and a prepreg using a cross of PAN based carbon fiber having an elastic modulus of 785 GPa and PC film (thickness 50 μm) were manufactured, and it was confirmed that both can be manufactured without any problem. FIG. 4 shows a photograph of the manufactured semi-preg.

(Autoclave Molding)

The manufactured semi-preg was cut into 320×160 mm and the cut semi-preg was laminated for 12 plies and bagged (packed) at a bagging pressure of −0.1 MPa, and set in a half type forming die for partial structure test (FIGS. 5 and 6). For the bagging of the cut specimen, Teflon (registered trademark) film was used as a bagging film (packaging material for vacuum deaeration). The molding temperature was 300° C., the molding pressure was 3 MPa, and the holding time was 30 minutes. The semi-preg was molded by autoclave.

If the molding temperature exceeds 330° C., it is necessary to use a film made of polyimide having poor flexibility and easy to tear. Since the molding temperature using PC can be decreased down to 300° C., Teflon (registered trademark) film being flexible and having superior formativeness as bagging film is available for the molding in an autocrave.

Figure 7:
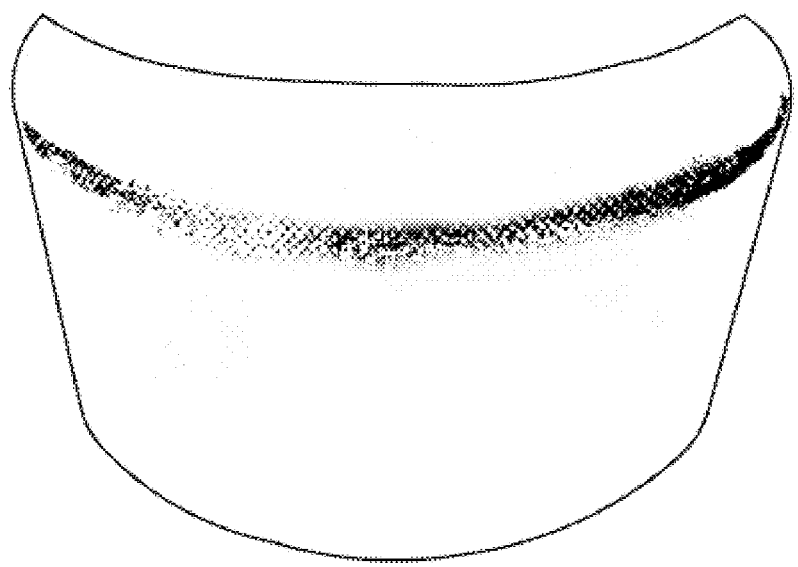

FIG. 7 shows a photograph showing the fire retardant carbon fiber reinforced plastic (CFRTP-PC) of the present invention after autoclave molding. As it is shown in FIG. 7, curved surface molding was completed without any problem.

<Tensile Test for PC>

Figure 8:
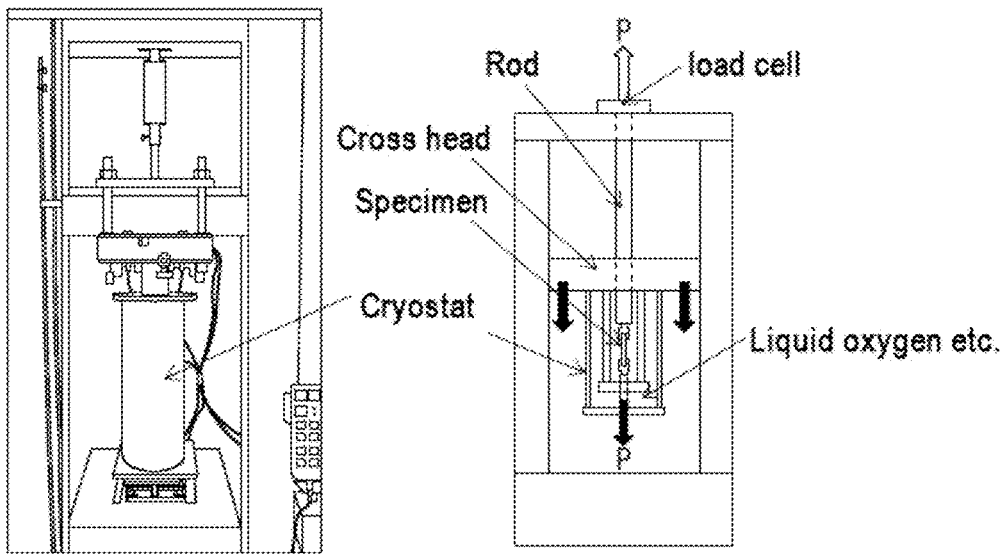

Tensile testing for PC at room temperature and in liquid nitrogen (−196° C.) was performed using the universal tester (universal tester with cryostat) shown in FIG. 8. Considering the variation of data, the test was performed three times at normal temperature, and three times at cryogenic temperature. The tensile test and compression test can be performed using the universal tester in both the room and cryogenic temperature.

Figure 9:
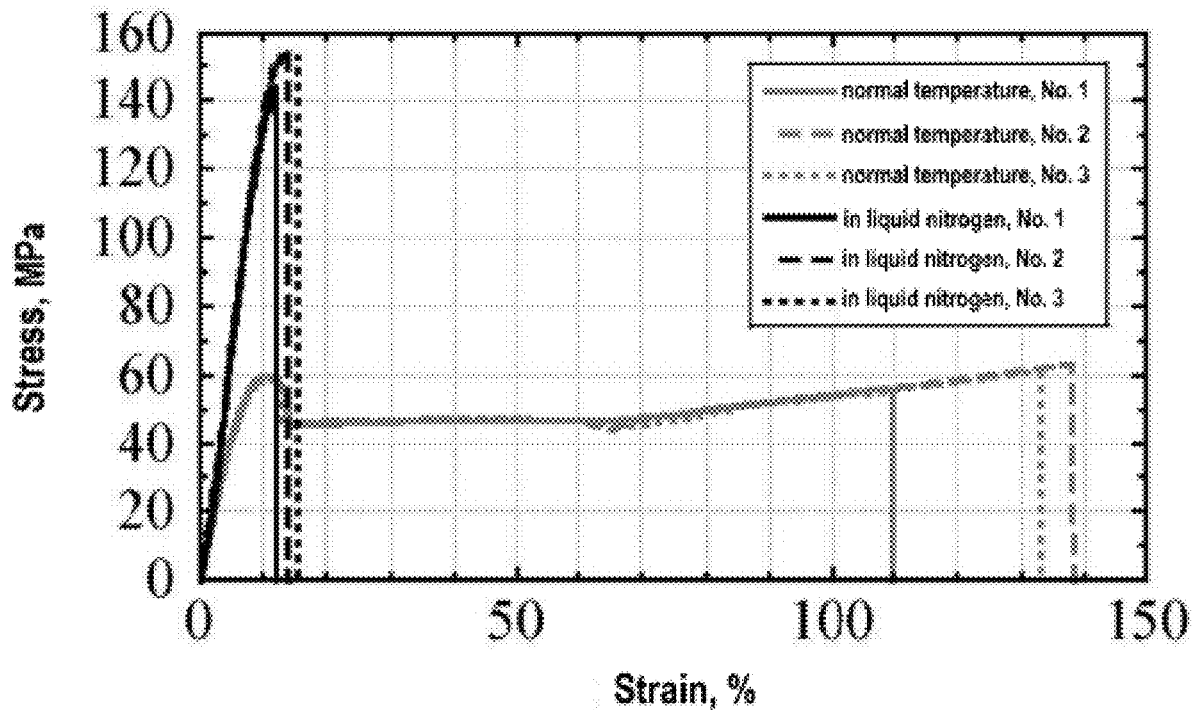

FIG. 9 shows the stress-strain diagram of PC. The breaking strain in liquid nitrogen was 12-15%. The linear coefficient of expansion of the carbon fiber was $-1.5 \times 10^{-6}/°$ C. (elastic modulus 785 GPa), and the PC was $66 \times 10^{-6}/°$ C. used in the fire retardant carbon fiber reinforced plastic (CFRTP-PC). The heat strain when the temperature decreases from room temperature down to −200° C., is −0.03% for carbon fiber, and 1.4% for PC. Since the difference in thermal strain between the carbon fiber and PC is about one tenth of the breakage strain of PC, there seems to be no problem in matrix cracks at the cryogenic temperature.

INDUSTRIALLY APPLICABILITY

The fire retardant material of the present invention with light and high specific strength has fire retardancy in the presence of high oxidation property such as liquid oxygen. Application of the fire retardant material to liquid oxygen tank not only for space rockets, but also ground tank lorries and etc., is for commercially useful.

The invention claimed is:

1. A tank for storing oxygen, wherein a part or whole is constituted from a fire retardant material comprising a carbon fiber having tensile elasticity of 700 GPa or more.

2. The tank for storing liquid oxygen according to claim 1, further comprising:
   a carbon fiber having tensile elasticity of 700 GPa or more, and
   a fire retardant resin.

3. The tank for storing liquid oxygen according to claim 1, wherein the carbon fiber is a pitch-based carbon fiber.

4. The tank for storing liquid oxygen according to claim 2, wherein
   the fire retardant resin is a resin in which a number of ignition is two times or less when 20 times of impact test are performed by ABMA type impact tester complying with ASTM test method D2512-95.

5. The tank for storing liquid oxygen according to claim 2, wherein the fire retardant resin is at least one type of resin selected from polycarbonate, polyether ether ketone, polytetrafluoroethylene, ethylene tetrafluoroethylene copolymer, and tetrafluoroethylene-perfluoroalkyl vinyl ether copolymer.

6. The tank for storing liquid oxygen according to claim 5, wherein the fire retardant resin is polycarbonate.

* * * * *